(No Model.)
W. H. REITZ.
WHEAT STEAMER, HEATER, AND FEED REGULATOR.
No. 567,509.  Patented Sept. 8, 1896.
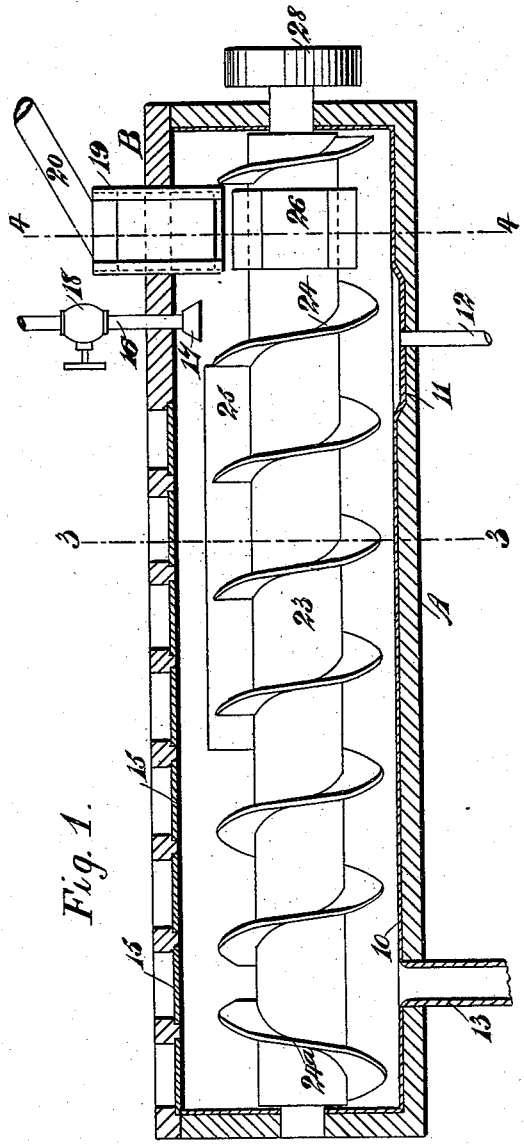
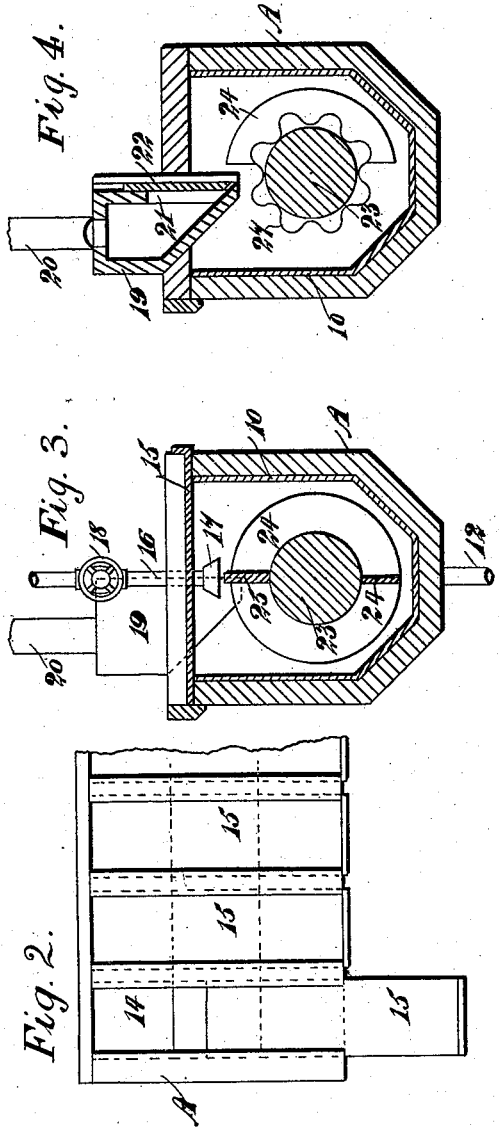
WITNESSES:
INVENTOR
W. H. Reitz
BY
ATTORNEYS

UNITED STATES PATENT OFFICE.

WILLIAM H. REITZ, OF SOMERSET, PENNSYLVANIA.

WHEAT STEAMER, HEATER, AND FEED-REGULATOR.

SPECIFICATION forming part of Letters Patent No. 567,509, dated September 8, 1896.

Application filed January 10, 1896. Serial No. 575,021. (No model.)

*To all whom it may concern:*

Be it known that I, WILLIAM H. REITZ, of Somerset, in the county of Somerset and State of Pennsylvania, have invented a new and Improved Wheat Steamer, Heater, and Feed-Regulator, of which the following is a full, clear, and exact description.

My invention relates to a device adapted for use in connection with flour-mills in which will be combined a steamer, heater, and feed-regulator for the grains of wheat prior to the passage of the same to the break-rolls, and the object of the invention is to provide a device of this character by means of which the grain will be spouted or otherwise fed to the storage-bin, the feed of the grain to the device being under thorough control, and whereby also the grain will be steamed or moistened within the device, the extent to which the grain shall be moistened being under perfect control.

Another object of the invention is to so construct the flights of the conveyer that the wheat will be carried from under the conveyer and thrown over the top to the opposite side, and as the grain is moistened by the steam or water of condensation at a point above the conveyer the said construction of the flights will bring the wheat in contact with the steam, and as it passes through the same and under the conveyer the grains of wheat will be thoroughly mixed and the surplus moisture on certain of the grains will be taken up by other of the grains, thus rendering all of them equally moist, and, furthermore, since the grain is thrown from one side of the conveyer to the other in quick succession the grains of wheat will be thoroughly warmed and the moisture will have no chance of penetrating to the kernel of the grain. When the grain is thus heated, the heat also serves to maintain the moisture upon the exterior surface of the grain.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a longitudinal vertical section through the device. Fig. 2 is a plan view of the tail portion of the device. Fig. 3 is a vertical transverse section taken substantially on the line 3 3 of Fig. 1, and Fig. 4 is a similar section taken on the line 4 4 of Fig. 1.

In carrying out the invention a box A is provided, the bottom whereof is ordinarily made substantially square. The box-body A of the machine is provided with a metal lining 10, and near the head end of the box-body a pocket or depression 11 is made, as best shown in Fig. 1, and the said depression or pocket connects with a drain-pipe 12. At or near the tail end of the box-body a discharge-spout 13 is located, through which the grain finds its exit. The top B of the box-body is provided with a series of openings 14, adapted to be wholly or partially closed by means of slides 15 of any suitable construction or material, and these openings and slides extend, preferably, from a point between the center and head of the box-body to the tail end of the same. A pipe 16, connected with any source of steam supply, is made to enter the interior of the box-body at the top, being placed at a point between the head and the nearest slide. The inner end of the pipe is provided with a nozzle 17, ordinarily of conical shape and provided with apertures, so that the water of condensation and steam may be sprayed within the said box-body. A valve 18 is located in the steam-supply pipe 16 at any desired point, and the said steam-supply pipe is preferably of such length that the steam will condense to a greater or less degree before it finds its way to the nozzle 17.

Near the head portion of the box-body A, but between the said head and the steam-supply pipe 16, a hopper 19 is constructed at the upper portion of the box-body, extending downward a predetermined distance therein, and the said hopper is connected by a spout 20 or its equivalent with the grain-bin or other source of grain supply. One wall of the hopper, where it enters the box-body, is preferably inclined, as shown in Fig. 4, the opposite wall being practically straight, and in this straight wall of the hopper an opening 21 is made, controlled by a valve or gate 22, having sliding movement in the said hopper. A conveyer is located within the said box-body, extending from end to end thereof, consisting of a circular body 23 and spiral flights 24, the said flights having such pitch, as shown in Fig. 1, that in addition to feeding the grain from the head to the tail portion of the box-body the said flights will also serve in a measure to carry the grain upward and around the body, but since all the spiral flights can operate in the above manner to a minor degree only a preferably straight flight 25 is located upon the body of the said conveyer, extending longitudinally thereof, and the head end of the straight flight is rearward of the steam-pipe, while the tail end of the said straight flight will extend below sundry of the slide-controlled openings 15, as shown in Fig. 1. It will be observed that the grain is moistened by the steam or water prior to it being acted upon by the straight flight 25, and this flight, as the conveyer revolves, will take the grain up from the bottom of the box-body and carry it smoothly over the upper face of the conveyer to the opposite side of the box-body, thereby insuring a constant agitation of the recently-moistened grain and providing for the removal of surplus moisture, and at the same time the grain will be heated to a certain extent.

The main spiral flight 24 terminates at a point at one side of the exit-opening 13 for the grain, and a short spiral flight 24$^a$ is formed upon the body of the conveyer at its rear end, having a reverse pitch to the main flight 24. The said short flight 24$^a$ is at the opposite side of the grain-exit opening or chute 13 and serves to retard the grain at the tail of the box-body and direct it to the aforesaid exit-opening. A feed-wheel 26 is located on the body portion of the conveyer immediately below the hopper 19, and the said feed-wheel is preferably provided with a corrugated or toothed peripheral surface, the teeth 27 of the said wheel ordinarily having rounded end surfaces, as shown also in Fig. 4. The feed of material into the box-body is controlled by the wheel 26 and the valve 22 of the aforesaid hopper 19. The extent to which the grain is moistened and heated is governed by the number of openings 14 uncovered by the slides 15. It will be noticed that owing to the relation of the feed-wheel to the hopper and the construction of the said wheel during the time the conveyer is revolved the feed of grain will be constant, but the moment that the conveyer is stopped the grain will clog or bank up between the feed-wheel and hopper, and the feed will be instantly stopped.

The pocket 11 is intended to carry off any water that may accumulate in the box-body of the device after the device has stopped running should not the steam or water be turned off immediately. A pulley 28 is preferably located at one end of the conveyer for the purpose of driving the same. The device is placed on top of the first break-roll of a wheat-grinding machine, and the wheat as discharged from the device drops into the feeder of the roll and is fed into the said roll in the same manner as the feed of the second and third breaks from the scalpers.

Among the advantages that may be mentioned with reference to the improved machine is, first, that the feed-wheel 26 is so short that the feed-gate has to be opened wide to let through sufficient wheat to bring the machine up to its full capacity. Hence it will allow any foreign substance to pass through also, while the ordinary roll or shake-feed, usually placed on roller-mills to regulate the flow of the mill, is as long as the rolls are, and the feed-gate is rigid and the opening so small that it will not admit the passage of anything much larger than the grain itself.

When the feeder is constructed in the usual manner and is of equal length to the crush-roll below it, it is necessary to clean the feeder several times a day, since it frequently happens that the feeder will become clogged by foreign matter entering with the wheat to such an extent before the stoppage is noticed that the flow to the mill will be so diminished as to materially lower the grade of the flour. All the attention that the improved device needs is that the operator shall regulate the steam and condensed-water supply in a manner to obtain the proper temper for the wheat, and the advantage of having the wheat tempered and warmed at the same time, provided it is thoroughly and evenly done, is to toughen the bran to such an extent that it will not be cut up or pulverized as much as heretofore during the process of grinding. Hence the flour from the first grinding will be more even, cleaner, and whiter than that usually obtained at that time, and the middlings will also be cleaner and in better shape for the purifiers.

Having thus described my invention, I claim as new and desire to secure by Letters Patent—

In a device for feeding grain, the combination, with a box, a conveyer located within the said box, and provided with spirally and longitudinally arranged flights, a valve-controlled hopper located at the head end of the box, and a series of valves located between the said hopper and the tail end of the box, of a feed-wheel carried by the said conveyer, located beneath the said hopper and provided with peripheral teeth, and a pipe adapted to introduce moisture into the box, the pipe being located between the series of valves and the said hopper, as and for the purpose specified.

WILLIAM H. REITZ.

Witnesses:
FRANK LONG,
H. F. KNEPPER.